2,784,072
HERBICIDAL COMPOSITION

John A. Garman and Walter P. Brian, Baltimore, Md., assignors, by mesne assignments, to Food Machinery and Chemical Corporation, New York, N. Y., a corporation of Delaware No Drawing. Application March 25, 1954,
Serial No. 418,776

7 Claims. (Cl. 71—2.6)

This invention relates generally to the selective destruction of plants and the selective control and inhibition of undesirable plant growth, and more particularly, it relates to an improved herbicide and herbicidal compositions therefrom which are especially useful in selectively destroying plants and selectively controlling and inhibiting plant growth.

It has previously been proposed to destroy plants or selectively discourage plant growth by treating either the soil or the plants, or both, with solutions of organic carbamate compounds, for example, such compounds as isopropyl N-phenylcarbamate and 2-chloroethyl N-phenylcarbamate are known as effective general weed killers or herbicides. It is desirable that such heribcides should be highly selective, that is, they should kill weeds and other undesirable plants but not adversely affect the desired plant crop under the same conditions. Many of the already known compounds cannot be used with common crops since the dosage level required to destroy the undesirable plants also destroys the crop.

The object of the present invention is to provide agricultural industry with a selective method for destroying weeds and other undesirable plants, or inhibiting the growth of such plants without affecting the growth of the desired plant crop, and thereby provide a herbicide of greater selectivity and usefulness than those heretofore known.

This object and other objects, as will hereinafter appear, are accomplished by the present invention. This invention is based on the discovery that 2-(1,3-dichloropropyl) N-phenylcarbamate shows a surprisingly great herbicide selectivity for many common undesirable plants, particularly the monocotyledonous grasses, while not adversely affecting such common crops as peas, corn, cotton, and soybeans.

The formula for this compound which shows such exceptional herbicidal selectivity is as follows:

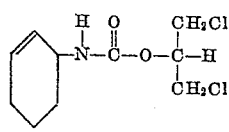

This compound may be prepared by any of several methods well known to those skilled in the art using known compounds. For example, it may be prepared by the reaction of phenyl isocyanate with 1,3-dichloropropanol-2 or by the reaction of aniline with 2-(1,3-dichloropropyl) chloroformate. The sample used for these tests was prepared by the former method in diethyl ether solvent. The isolated product was a white crystalline solid melting at 72–74° C. and having the following elemental analysis: Calculated for $C_{10}H_{11}NO_2Cl_2$—48.41% carbon, 4.47% hydrogen; found—48.50 carbon, 4.69 hydrogen.

The compound is stable under ordinary conditions and lends itself readily to formulation as in solutions, aqueous emulsions, impregnated dusts and the like. It is soluble in many of the common organic solvents, for instance, cyclohexanone, xylene, toluene, acetone, lower aliphatic alcohols, methylnaphthalenes, and the like. This compound has a particular advantage over compounds previously used as herbicides since it shows reduced volatility and hence prolonged residual activity and effectiveness in the treated soil. It is readily prepared in compositions at relatively high concentrations in organic solvents for shipping and storing and may be conveniently dispersed in aqueous emulsion form or otherwise at the point of use.

Advantageously, stable concentrates of the compound may be prepared for use in forming aqueous emulsions, for example, by mixing about 1 to 2 parts by weight of the carbamate, about 1 to 3 parts of organic solvent, and ½ to 1 part of a suitable emulsifying agent. At the point of use, this concentrate may be dispersed in from 4 to 100 parts of water to form an emulsion suitable for spraying. Preferably, the concentrate is diluted with about an equal volume of water immediately before the final dispersion for spraying.

A dusting powder may be prepared by impregnating 10 parts by weight of finely divided clay, talc, or other inert solid carrier, with a solution of 12 parts of the carbamate, two parts of a suitable emulsifying agent and 10 parts of a solvent such as acetone. The acetone is then evaporated and the residual impregnated dust may be further diluted with the same, or other carrier to 5% to 30% of active ingredients, by weight, and applied by means of conventional equipment and methods. The residual impregnated dust may also be added to a suitable volume of water or other non-solvent fluent carrier, with vigorous agitation and the resulting suspension sprayed in the usual manner.

The compound is highly effective and selective whether used as a pre-emergent treatment, or as a post-emergent treatment. In post-emergent treatment, the herbicide will, usually, be applied primarily to the growing plant. In post-emergent treatment, however, the effects achieved are not necessarily due solely to the portion of the herbicide material which is subsequently retained on the growing plant parts since some effects are probably also achieved by some of the compound which actually reaches the soil and thereafter finds its way into the plant root system. In pre-emergent treatment, the herbicide will be applied to the soil, usually the seeded soil, before the plants have emerged therefrom and usually at the time of crop seeding. Reference herein, and in the appended claims, to treating the "plant life" will be understood to include both the pre-emergent treatment and the post-emergent treatment.

The invention will be further described and illustrated by the following specific examples of its use and effectiveness. It will be understood that these examples are for illustrating the invention and are not to be considered as limiting the scope thereof.

In the tests described below in the examples, the carbamate was applied in alcoholic solutions in order to control more accurately the proportions of the herbicide used. Application of alcohol alone at many times the dosages used in these compositions shows no detectable phytotoxic effects. It will be understood that this carbamate is equally effective, for instance, in the form of solutions, suspensions, dry-dusting powders and emulsions.

*Example 1*

The seeds were planted in sand in small fibre pots, kept in a greenhouse, and suitably watered on the surface at intervals. After planting, the soil was sprayed with an alcoholic solution of the particular herbicide involved so as to deposit on the sand in the pot the indicated amount of the herbicide per acre. The plant responses were noted 14 days after planting.

The herbicidal effectiveness and selectivity of the respective compounds are expressed in the terms appearing, together with their significance, in the following tabulation:

No effect=N-0
Slight effect=S 1-3
Moderate effect=M 4-6
Severe effect=Sev 7-10
Total kill=Sev 10

On the scale, 0 stands for no visible effect and 10 stands for complete inhibition of plant growth as evidenced by an absence of seedlings or by the killing of emergent seedlings.

Results obtained with 2-(1,3-dichloropropyl) N-phenylcarbamate are shown in Table 1 compared with those obtained with known herbicides, isopropyl N-phenylcarbamate and 2-chloroethyl N-phenylcarbamate.

TABLE 1

| Plant Species Under Test | 2-(1,3-dichloropropyl) N-phenylcarbamate | | Isopropyl N-phenylcarbamate | | 2-chloroethyl N-phenylcarbamate | |
|---|---|---|---|---|---|---|
| | Dosage, number/acre | Plant Response | Dosage, number/acre | Plant Response | Dosage, number/acre | Plant Response |
| Peas | 11 | S-1 | 9 | Sev-8 | 10 | S-3 |
| | 22 | S-1 | 22 | Sev-8 | 20 | Sev-9 |
| Corn | 11 | S-3 | 9 | Sev-9 | 10 | Sev-7 |
| | 22 | S-1 | 22 | Sev-9 | 20 | Sev-8 |
| Barley | 11 | Sev-8 | 9 | Sev-10 | 10 | |
| | 22 | Sev-10 | 22 | Sev-10 | 20 | |
| Rye grass | 11 | Sev-8 | 9 | Sev-10 | 10 | Sev-10 |
| | 22 | Sev-9 | 22 | Sev-10 | 20 | Sev-10 |
| Cotton | 11 | N-0 | 9 | M-5 | 10 | S-1 |
| | 22 | S-1 | 22 | M-6 | 20 | S-3 |
| Soybeans | 11 | N-0 | 9 | Sev-7 | 10 | S-3 |
| | 22 | | 22 | M-6 | 20 | Sev-8 |
| Wheat | 11 | Sev-7 | 9 | Sev-9 | 10 | M-4 |
| | 22 | Sev-8 | 22 | Sev-9 | 20 | M-6 |
| Crabgrass | 11 | Sev-8 | 9 | S-3 | 10 | Sev-7 |
| | 22 | Sev-8 | 22 | Sev-10 | 20 | Sev-9 |

It is evident from the above data that 2-(1,3-dichloropropyl) N-phenylcarbamate has little or no adverse effect upon such crops as peas, corn, cotton and soybeans but has a strong herbicidal action on the monocotyledonous plants such as barley, rye grass, wheat and crabgrass. This selective effect is entirely unexpected and could not have been foreseen. On the contrary, both the other known and described herbicides have a strongly adverse action on peas, cotton, and soybeans while at the same time adversely affecting corn and other monocotyledons.

*Example 2*

This example illustrates the preferential effect of 2-(1,3-dichloropropyl) N-phenylcarbamate on certain of the monocotyledonous grasses. The seeds were planted in sand in metal pans, maintained in a greenhouse, and watered at suitable intervals. Nine days after planting, the growing seedlings were sprayed with an alcoholic solution of the herbicide in such amounts as to give the indicated dosage of the herbicidal agent. Plant responses were noted 7 days after the post-emergent treatment and are shown in Table 2 below.

TABLE 2

| Plant Species Under Test | Dosage, number/acre | Plant Response |
|---|---|---|
| Crabgrass | 2 | N-0 |
| | 4 | Sev-10 |
| | 8 | Sev-10 |
| Kentucky Blue Grass | 2 | N-0 |
| | 4 | S-1 |
| | 8 | M-6 |
| Rye grass | 2 | N-0 |
| | 4 | N-0 |
| | 8 | S-1 |
| Alta Fescues | 2 | N-0 |
| | 4 | N-0 |
| | 8 | N-0 |

The above data show, for instance, that at a dosage of 4 pounds per acre, it is possible to completely eliminate crabgrass in the presence of Kentucky blue grass, rye grass, and Alta fescues.

*Example 3*

A further pre-emergent test was made using lower dosages of the 2-(1,3-dichloropropyl) N-phenylcarbamate. The seeds were planted in sand in metal pans as in Example 2, and the soil was sprayed on the day of planting with an alcoholic solution of the herbicide to give the indicated dosages. Plant responses were noted 14 days after planting and are shown in Table 3.

TABLE 3

| Plant Species Under Test | Dosage, number/acre | Plant Response |
|---|---|---|
| Cotton | 2 | N-0 |
| | 4 | N-0 |
| | 8 | N-0 |
| Soybeans | 2 | S-1 |
| | 4 | S-1 |
| | 8 | S-1 |
| Corn | 2 | S-3 |
| | 4 | S-3 |
| | 8 | S-3 |
| Oats | 2 | M-4 |
| | 4 | Sev-7 |
| | 8 | Sev-10 |
| Radish | 2 | S-3 |
| | 4 | S-1 |
| | 8 | S-3 |
| Crabgrass | 2 | S-2 |
| | 4 | M-4 |
| | 8 | Sev-10 |
| Chickweed | 2 | Sev-10 |
| | 4 | Sev-10 |
| | 8 | Sev-10 |

These results show a marked preferential action against oats, chickweed and crabgrass in the presence of a number of crop plants.

The proportions and concentrations of the applied solutions or emulsions containing the compound are subject to considerable variation. In general, the more concentrated the emulsion, the less required. Regardless of concentration of the solution or emulsion, the amount of active ingredient applied will be such as is toxic to undesired plant life, i. e., growing plants or seed, depending upon whether the treatment is pre-emergent or post-emergent.

From the foregoing examples, it will be apparent that, by varying the severity of the treatment, the relative herbicidal effectiveness of the carbamate may be readily controlled.

What is claimed is:

1. An herbicidal composition comprising 2-(1,3-dichloropropyl) N-phenylcarbamate and a carrier, said compound being present in said composition in a phytotoxic concentration.

2. An herbicidal composition comprising an aqueous emulsion of 2-(1,3-dichloropropyl) N-phenylcarbamate, said compound being present in said composition in a phytotoxic concentration.

3. An herbicidal composition comprising 2-(1,3-dichloropropyl) N-phenylcarbamate and a non-solvent fluent carrier, said compound being present in said composition in a phytotoxic concentration.

4. An herbicidal composition comprising a solution of 2-(1,3-dichloropropyl) N-phenylcarbamate in an organic solvent, said compound being present in said composition in a phytotoxic concentration.

5. The method of selectively controlling plant growth comprising desired and undesired plant species which comprises treating the plant growth with 2-(1,3-dichloropropyl) N-phenyl-carbamate in an amount and concentration which is phytotoxic to the undesired plant species and substantially harmless to the desired plant species.

6. The method of selectively controlling plant growth comprising desired and undesired plant species in the same soil which comprises treating the soil with 2-(1,3-dichloropropyl) N-phenylcarbamate in an amount and concentration which is phytotoxic to the undesired plant species and substantially harmless to the desired plant species.

7. The method of selectively controlling plant growth comprising desired and undesired plant species which comprises treating the foliage of the plant growth with 2-(1,3-dichloropropyl) N-phenylcarbamate in an amount and concentration which is phytotoxic to the undesired plant species and substantially harmless to the desired plant species.

No references cited.